United States Patent [19]

Kortelainen et al.

[11] Patent Number: 5,799,746
[45] Date of Patent: Sep. 1, 1998

[54] UNDERGROUND VEHICLE SAFETY CAB WITH SAFETY BAR

[75] Inventors: Antti Kortelainen; Esko Koskinen, both of Turku; Jarkko Laine, Lieto, all of Finland

[73] Assignee: Tamrock Loaders Oy, Turku, Finland

[21] Appl. No.: 648,131

[22] PCT Filed: Nov. 16, 1994

[86] PCT No.: PCT/FI94/00514

§ 371 Date: May 17, 1996

§ 102(e) Date: May 17, 1996

[87] PCT Pub. No.: WO95/13939

PCT Pub. Date: May 26, 1995

[30] Foreign Application Priority Data

Nov. 17, 1993 [FI] Finland .................. 935098

[51] Int. Cl.⁶ .................. B60R 21/13; B62D 33/06
[52] U.S. Cl. .................. 180/89.12; 280/756; 296/190
[58] Field of Search .................. 280/756, 748; 180/89.12; 296/190, 102

[56] References Cited

U.S. PATENT DOCUMENTS

| | | |
|---|---|---|
| 3,791,668 | 2/1974 | Adams .................. 280/756 |
| 3,976,323 | 8/1976 | Godfrey .................. 280/756 |
| 4,050,735 | 9/1977 | Molnar .................. 296/102 |
| 4,515,234 | 5/1985 | Loy et al. .................. 180/89.12 |
| 4,531,776 | 7/1985 | Laws et al. .................. 296/190 |

FOREIGN PATENT DOCUMENTS

| | | |
|---|---|---|
| 906027 | 7/1972 | Canada .................. 280/756 |
| 1430761 | 11/1968 | Germany .................. 280/756 |
| A1-2409076 | 8/1975 | Germany . |
| A1-2827614 | 1/1979 | Germany . |
| 695871 | 11/1979 | U.S.S.R. . |
| A-2194921 | 3/1988 | United Kingdom . |

*Primary Examiner*—Peter C. English
*Attorney, Agent, or Firm*—Nixon & Vanderhye P.C.

[57] ABSTRACT

The invention relates to a safety cab arrangement for an underground mobile machine intended, for example, for mining. A safety cab (2) secured to the frame of the machine (1) is equipped with L shaped outside safety bars (3) which receive forces and which are secured to the safety cab (2) and to the machine (1). The safety cab (2) transmit lateral and longitude forces to the safety bars and withstands vertical forces independently.

7 Claims, 9 Drawing Sheets

UNDERGROUND VEHICLE SAFETY CAB WITH SAFETY BAR

BACKGROUND

The invention relates to a safety cab arrangement for underground mobile machines, such as LHD machines (Load, Haul, Dump) and dumpers intended for mining. The safety cab comprises a frame consisting of side panels, a roof panel and a floor, and an outside construction of bars and fixing elements which receive forces acting on the cab.

Conventionally in machines and dumpers intended for mining the cab has been built to withstand forces and loadings imposed on it only if especially required. A particularly strong cab, designed according to the loadings imposed on it, has been used to provide such a construction. A more advanced form of this heavy cab is a cab with a lightweight construction, around which a framework is built to directly receive the loading the cab is required to withstand. An essential part of both arrangements is that the safety cab is protected by a separate safety construction. The safety construction can be made of either cantilevers or safety ribs and it is fixed inflexibly to the frame of the machine. This construction protects the safety cab which is situated beneath it and is usually mounted flexibly on the frame of the machine. Even this construction is massive and requires a great deal of space.

The cab itself cannot withstand the forces specified in the safety norms. In case of an underground machine where the operator sits at the side of the machine, the construction described above increases the height and the width of the machine. The use of larger machines requires larger tunnels in a mine, for example, which, on the other hand, is financially impossible. Therefore it is necessary to use a smaller machine, which decreases the loading capacity and increases the total cost of the hauling of the blasted rock.

It is also characteristic of this kind of construction in an underground machine that the normal maintenance and repairs of the equipment become more difficult since the safety constructions are situated in the area of maintenance and repair operations. The fixed structures of safety ribs and safety frameworks also complicate the maintenance operations because they are usually difficult to dismount.

In LHD machines and dumpers intended for mining the cab is usually installed aside from the longitudinal axis of the machine and, moreover, in LHD machines the operator normally sits sideways. It is required of cabs accepted into use that they fulfil the requirements of the existing norms. Furthermore, within the European Community (EU), safety cabs are required to comply with the so-called ROPS and FOPS norms (Roll over protective structure and Falling object protective structure). In different countries there are also national requirements for the safety cabs of LHD machines. In general these norms and requirements prescribe that in the event the machine overturns there must remain a sufficiently large safety space for the operator. Moreover, the standards require a laboratory test, conducted by an officially approved testing institute, where the cab is loaded in both the lateral and longitudinal direction and from above. When subjected to lateral loading the cab is required to withstand a given force and its construction is required to absorb a specified amount of energy. Besides this the cab is also required to withstand a given vertical and longitudinal force. The magnitude of the forces and the amount of energy are determined by the weight of the machine. As a result, the heavier the machine is, the greater the forces the structures are required to withstand. During the aforesaid tests the changes in the shape of the cab have to remain so small that the safety space of the operator remains intact.

The greatest drawback of the present safety cabs or canopies has often been that they do not pass the new tests. When a cab is designed according to the latest requirements. It easily becomes very heavy and cumbersome. The use of separate safety ribs and safety frameworks tends to make the machine clumsy and unsuitable for use in confined spaces. Moreover, the structures of safety ribs and safety frameworks hinder the normal maintenance of the machines as described above. A cab equipped with safety ribs and safety frameworks, or an especially reinforced cab is often a very expensive construction to realize.

SUMMARY OF THE INVENTION

The arrangement according to the invention largely eliminates the aforesaid disadvantages and improves safety. The device according to the invention is characterized by what is described in the appended claims.

The most important advantage of the invention is that a safety cab or canopy meeting the requirements of the existing norms can be built in quite a small space. Prior cab constructions can be exploited in the arrangement according to the invention. The arrangement according to the invention can be applied as an accessory to the cabs of the older machine types. Safety bars installed outside the cab receive forces, absorb the energy and act as flexible elements, damping the shaking of the cab.

This arrangement provides, among other things, the following advantages. The size of the machine remains as small as possible; therefore the blasted rock can be hauled in tunnels or in similar spaces by means of equipment of maximum efficiency. It is also possible to provide a cab which is both sound-proof and shake-proof or an open shake-proof cab. Moreover, the machine is as easy as possible to maintain and repair The safety devices do not require extra space either.

In the following the invention is described in detail with reference to the accompanying drawings.

DETAILED DESCRIPTION OF THE DRAWINGS

Figure 1:
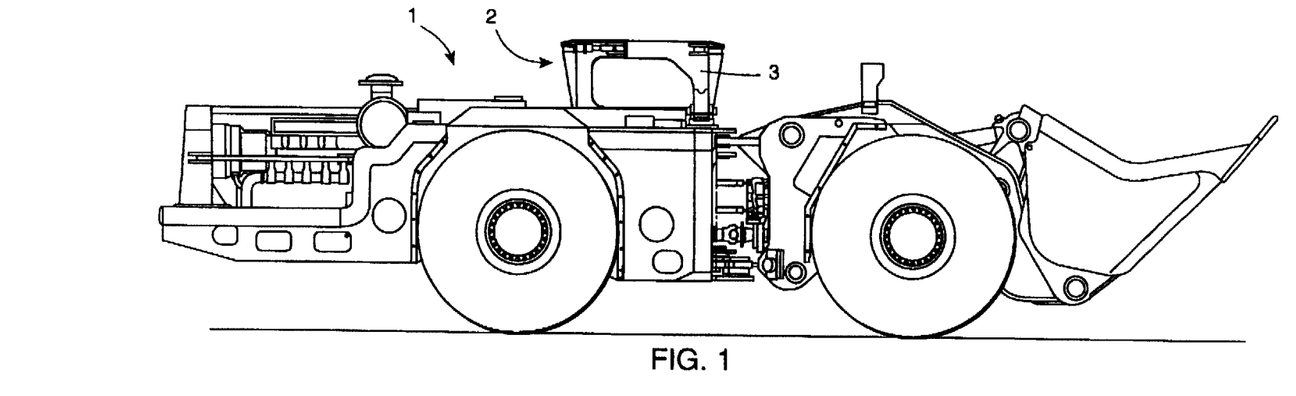
FIG. 1 is a side view of a machine equipped with a safety cab.
Figure 2:
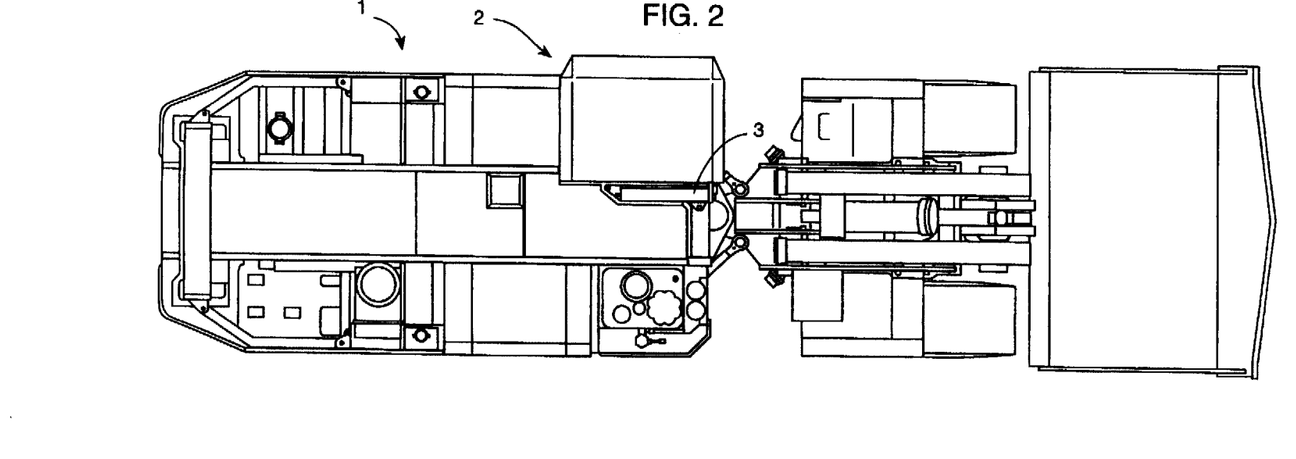
FIG. 2 is a top view of the machine equipped with the safety cab.
Figure 3:
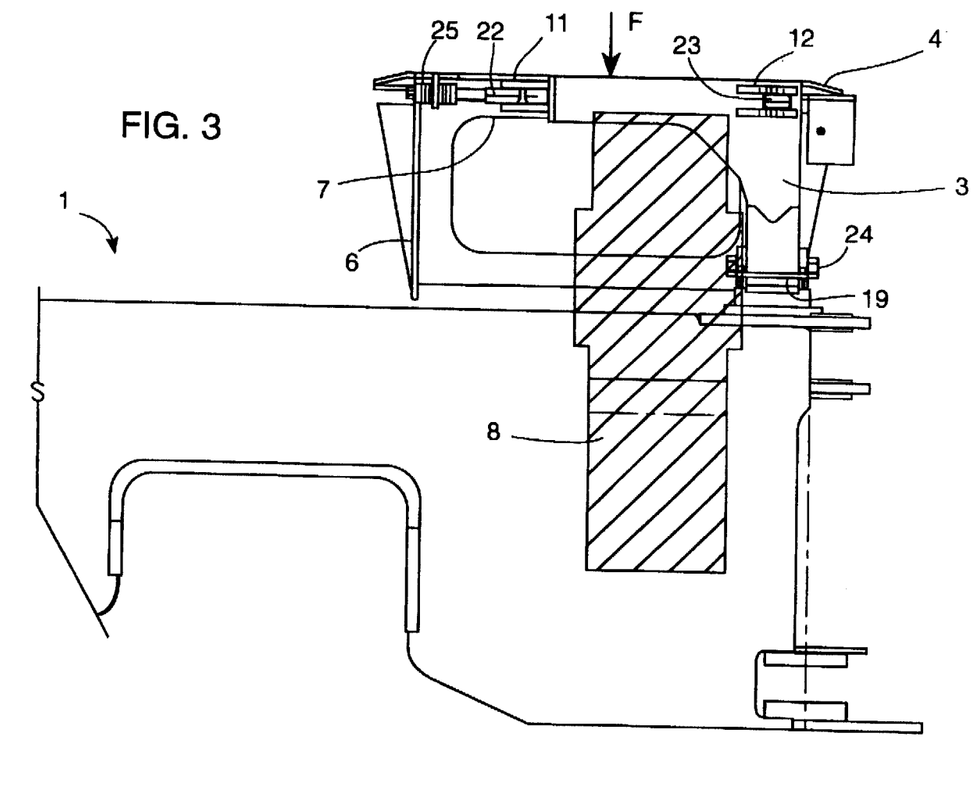
FIG. 3 is a side view of a safety cab equipped with one safety bar.
Figure 4:
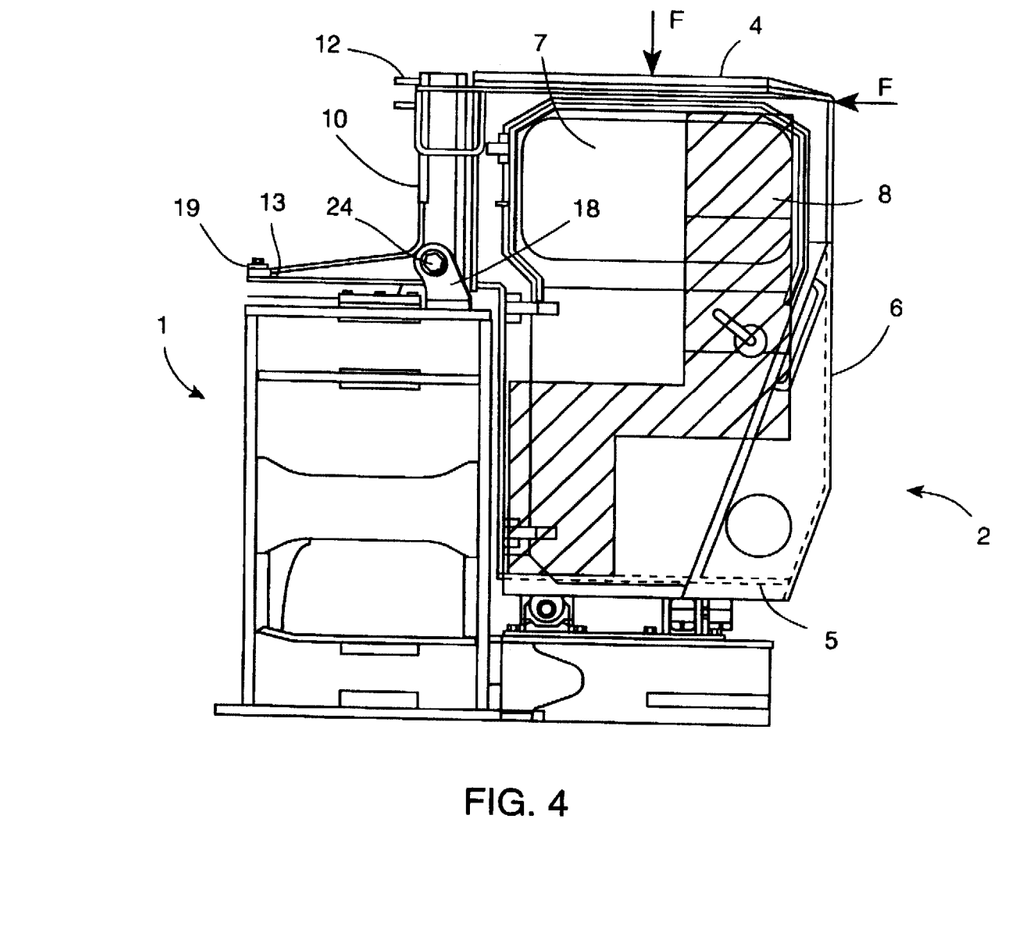
FIG. 4 is a front view of the safety cab equipped with one safety bar.
Figure 5:
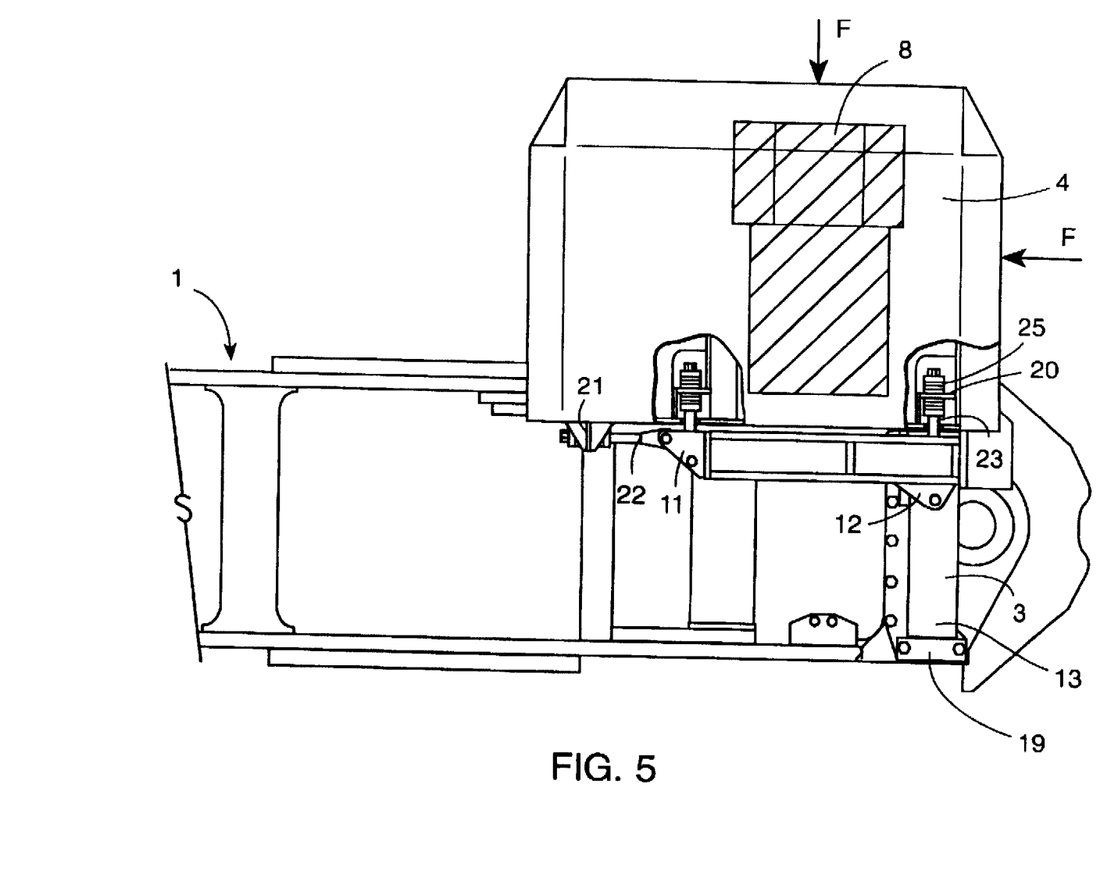
FIG. 5 is a top view of the safety cab equipped with one safety bar.
Figure 6:
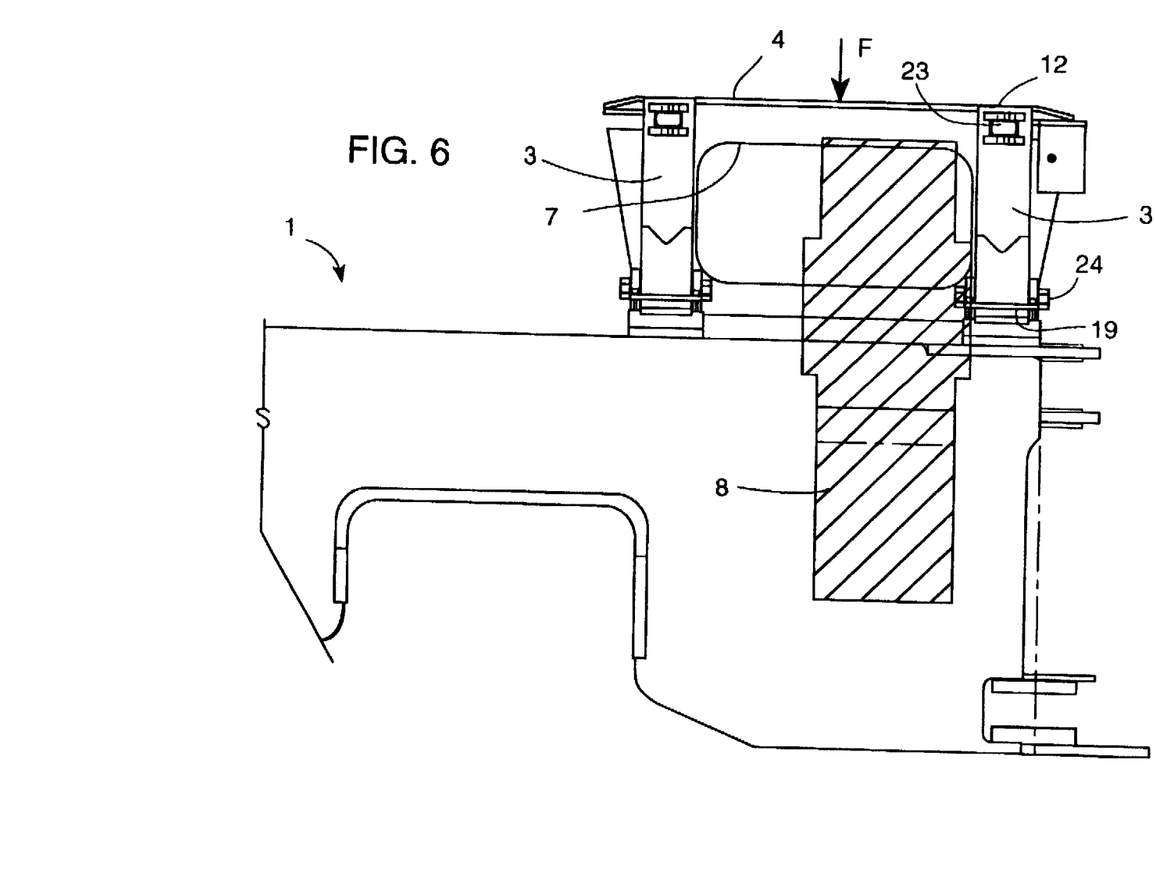
FIG. 6 is a side view of a safety cab equipped with two safety bars.
Figure 7:
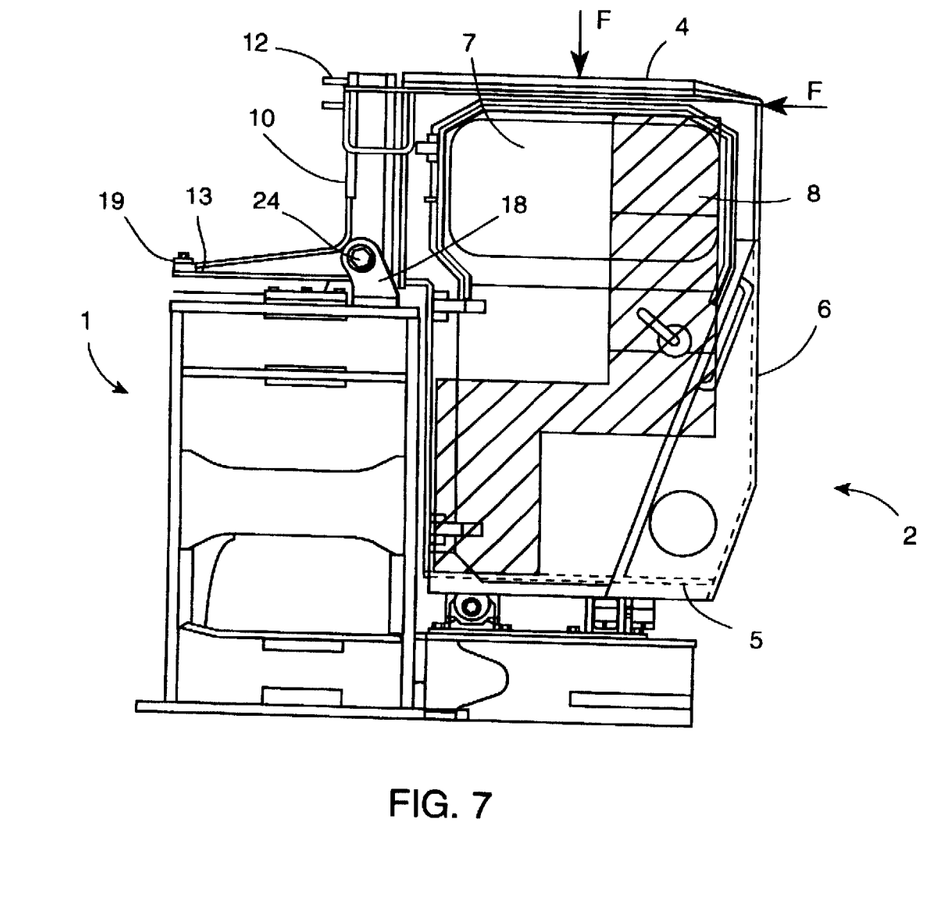
FIG. 7 is a front view of the safety cab equipped with two safety bars.
Figure 8:
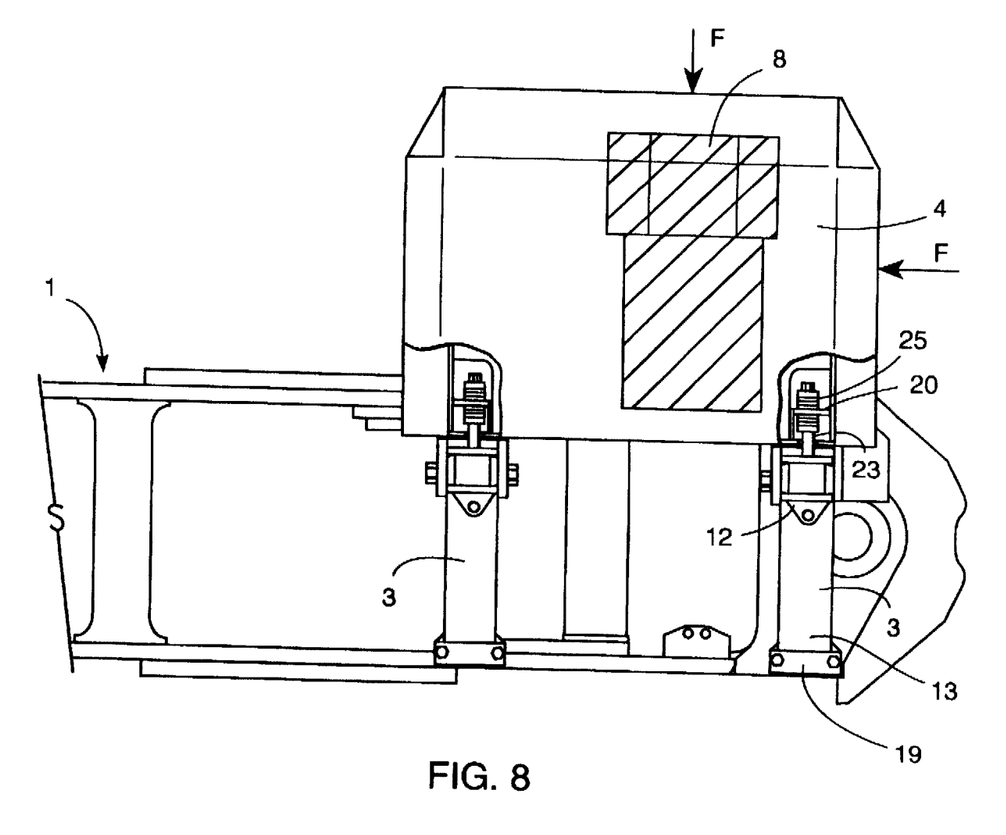
FIG. 8 is a top view of the safety cab equipped with two safety bars.
Figures 9, 10:
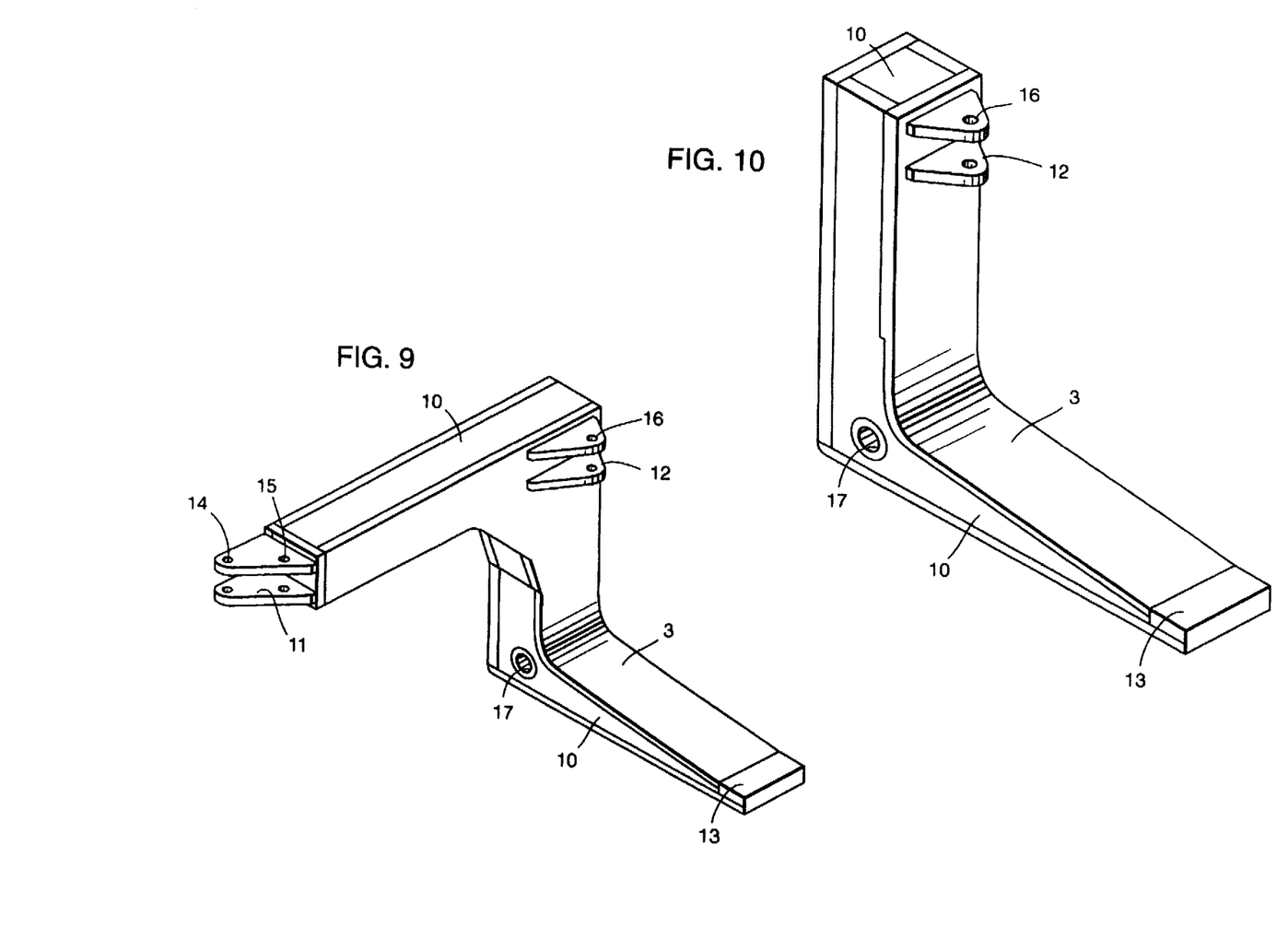
FIG. 9 is a schematic view of a safety bar.
FIG. 10 is a schematic view of a safety bar used in connection with the safety cab equipped with two safety bars.
Figure 11:
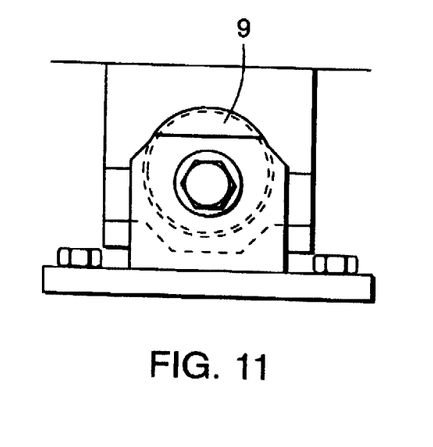
FIG. 11 is a detailed view of the fastening of the safety cab bottom to the machine.

In FIGS. 1 to 11 reference numeral 1 denotes the machine. The safety cab is denoted with reference numeral 2 and the safety bar with numeral 3. Reference numeral 4 denotes the roof panel of the safety cab, numeral 5 the floor and numeral 6 the side panels. The window of the safety cab is denoted by numeral 7. The safety space of the operator is marked in the Figures by hatching and by numeral 8. The safety cab 2 is secured from the bottom 5 to the machine 1 by means of flexible fixing elements 9. The safety bars 3 are made of plates 10 in the form of box girders. Numerals 11 and 12 denote the attachment brackets of the safety bar. An attachment point is denoted by numeral 13. Numerals 14, 15, 16 denote holes for the reaction bars of the safety bars. Numeral 17 denotes a hole for the bolt 24. Numeral 18 denotes the attachment bracket of the safety bar bend. The attachment point 13 is secured to the machine by means of a fixing element 19. Reaction bars 22 and 23 are attached to the brackets 20 and 21 situated in the upper part of the safety cab 2. The safety bar 3 is secured from the bend to the attachment bracket 18 by means of a bolt 24. Rubber dampers in the reaction bars 22 and 23 are denoted by reference numeral 25. The safety cab 2 is installed by means of an outside safety bar 3, which is intended to receive both lateral and longitudinal forces and to absorb a given lateral energy. FIGS. 3 to 8 show the forces acting on the safety cab 2 by means of arrows. What is also novel in the solution according to the invention is that the forces F the construction is required to withstand are transmitted through the frame of the cab 2 to the safety bars 3. The frame of the cab 2 with its fastenings has to independently withstand a given vertical loading. The safety bar 3 is L shaped if viewed from the side, and if only one safety bar is used, it is also L shaped when viewed in the longitudinal direction, and it is attached from two points of its lower end to the frame. The point of attachment comprises the bracket 18 and the bolt 24, and is joint-like. The other fixing element 19 to which the attachment point 13 is secured is a sliding element. Under load conditions, the upper end of the safety bar 3 leans on the roof panel 4 of the safety cab 2. The safety cab 2 is secured to the upper end of the safety bar 3 by means of reaction bars 22 and 23, and rubber pads 25 which in normal use damp horizontal forces. The safety bar 3 is designed in such a way that it can absorb a given energy by bending at both its horizontal and vertical part. The invention provides thus a small construction having great flexibility. The safety cab 2 can be reinforced by means of either one or more safety bars 3. In the embodiment with two safety bars 3, L shaped bars are installed both in the front and the rear corner of the safety cab 2. A lateral force is distributed evenly on both bars. In the embodiment with one safety bar 3 the bar is installed in the front corner of the safety cab 2 due to the construction of the cab 2 and the frame of the machine. This arrangement facilitates the maintenance of the machine 1 and reduces the visibility of the operator as little as possible. In the upper part of the safety cab 2 there is a longitudinal beam which under load conditions leans along its entire length on the roof panel 4 of the cab 2. Since the safety bar 3 is installed aside from the longitudinal axis of the cab 2, the vertical part of the safety bar 3 is also reinforced to prevent the cab 2 from twisting. A safety cab 2 equipped with the safety bar 3 according to the invention has passed the required laboratory tests.

An essential feature of the present solution is that the construction includes a safety cab or canopy 2 that is strong enough to transmit the required forces to one or more separate safety bars 3 and to the frame of the machine 1. The forces (see arrows F in FIGS. 3–8) are controlled by the interaction of the safety cab or canopy 2 and the separate safety bar(s) 3.

The sound- and shake-proof safety cab 2 is secured both to the frame of the machine 1 and to the safety bar(s) 3 by means of flexible fixing elements 9 and 25. When great forces act on the frame of the safety cab or canopy, the flexible fixing elements 25 yield to their limit, after which the forces are transmitted through mechanical securing means to the safety bar(s) 3 and to the frame of the machine 1.

It is clear that a safety cab according to the invention may be realized in widely varying physical forms. The safety cab 2 can be mechanically secured to the frame of the machine 1 in different ways and from different points. Due to the shape of the safety cab 2 the fixing points and fixing elements of the safety bar may vary suite widely within the spirit of this invention.

We claim:

1. A safety cab for an underground mobile machine including a roof panel, a floor, side panels and at least one safety bar, said at least one safety bar comprising a substantially L-shaped girder located externally of the safety cab and having a vertical component secured at an upper end thereof to an upper portion of the safety cab substantially adjacent said roof panel and a first horizontal component secured at a free end thereof to said machine at a location between said roof panel and said floor, said at least one safety bar further secured to said machine at an interface between said vertical and horizontal components; said horizontal component extending transversely to a longitudinal axis of the machine, such that said at least one safety bar receives lateral and longitudinal forces acting on said safety cab.

2. The safety cab of claim 1 wherein said at least one safety bar comprises a pair of safety bars secured between said cab and said machine in substantially parallel orientation, along one side of said safety cab.

3. The safety cab of claim 1 wherein said at least one safety bar includes a second horizontal component extending transversely of said first horizontal component, wherein said first and second horizontal components are spaced apart by said vertical component.

4. The safety cab of claim 3 wherein said at least one safety bar is attached to said machine at said interface by means of a bolt extending parallel to said second horizontal component.

5. The safety cab of claim 1 wherein said at least one safety bar is secured to said safety cab by at least one reaction bar and means for damping forces applied to said safety cab.

6. The safety cab of claim 1 wherein the free end of said horizontal component is slidably received in a fixing element on said machine.

7. The safety cab of claim 1 wherein said at least one safety bar is attached to said machine at said interface by means of a bolt extending parallel to said longitudinal axis of said machine.

* * * * *

UNITED STATES PATENT AND TRADEMARK OFFICE
CERTIFICATE OF CORRECTION

PATENT NO. : 5,799,746
DATED : September 1, 1998
INVENTOR(S) : KORTELAINEN et al.

It is certified that error appears in the above-identified patent and that said letters patent is hereby corrected as shown below:

On the title page,
item [73] Assignee: Tamrock Loaders Oy, Turku, Finland should read:
--Tamrock Oy, Tampere Finland--.

Signed and Sealed this

Thirty-first Day of August, 1999

*Attest:*

Q. TODD DICKINSON

*Attesting Officer*        *Acting Commissioner of Patents and Trademarks*